United States Patent
Boileau (10) Patent No.: US 11,313,323 B2
(45) Date of Patent: Apr. 26, 2022

(54) PROPULSION UNIT FOR AIRCRAFT COMPRISING AN ASSEMBLY BOX-TYPE STRUCTURE IN THE SIX O'CLOCK POSITION

(71) Applicant: Safran Nacelles, Gonfreville L'Orcher (FR)

(72) Inventor: Patrick Boileau, Gonfreville L'Orcher (FR)

(73) Assignee: Safran Nacelles, Gonfreville L'Orcher (FR)

( * ) Notice: Subject to any disclaimer, the term of this patent is extended or adjusted under 35 U.S.C. 154(b) by 85 days.

(21) Appl. No.: 16/901,690

(22) Filed: Jun. 15, 2020

(65) Prior Publication Data
US 2020/0309065 A1 Oct. 1, 2020

Related U.S. Application Data

(63) Continuation of application No. PCT/FR2018/053271, filed on Dec. 13, 2018.

(30) Foreign Application Priority Data

Dec. 13, 2017 (FR) ...................................... 17/62052

(51) Int. Cl.
*F02K 1/70* (2006.01)
*F02K 1/72* (2006.01)
(Continued)

(52) U.S. Cl.
CPC ................ *F02K 1/70* (2013.01); *B64D 27/16* (2013.01); *B64D 29/06* (2013.01); *B64D 29/08* (2013.01); *F02K 1/72* (2013.01)

(58) Field of Classification Search
CPC .. F02K 1/70; F02K 1/72; B64D 29/06; B64D 29/08
See application file for complete search history.

(56) References Cited

U.S. PATENT DOCUMENTS

| | | | |
|---|---|---|---|
| 4,683,717 A * | 8/1987 | Naud ..................... | B64D 29/08 60/226.1 |
| 2014/0027602 A1* | 1/2014 | Layland ................. | B64D 27/26 248/554 |

(Continued)

FOREIGN PATENT DOCUMENTS

| FR | 2920131 | 2/2009 |
|---|---|---|
| WO | 2013038093 | 3/2013 |
| WO | 2016116709 | 7/2016 |

OTHER PUBLICATIONS

International Search Report for International Application PCT/FR2018/053271, dated Mar. 25, 2019.

*Primary Examiner* — Andrew H Nguyen
(74) *Attorney, Agent, or Firm* — Burris Law, PLLC (57) ABSTRACT

A propulsion unit for an aircraft including a nacelle with a D-shaped structure housing a thrust-reversing device with movable vanes, the nacelle containing two D-shaped half-structures each including an external reverser half-cowl. The propulsion unit contains an assembly box-type structure, attached in downstream cantilevered fashion to the turbojet engine fan casing, the box-type structure including two guide rails guiding the deflection vanes, a locking device between the assembly box-type structure and the half-beams in the six o'clock position of the D-shaped half-structures, the assembly box-type structure being arranged in the propulsion unit such that the guide rails guiding the vanes of the assembly box-type structure are situated in the continuation of the guide rails in the six o'clock position guiding the vanes attached to the fan casing, to provide continuity between the rails.

11 Claims, 5 Drawing Sheets

(51) Int. Cl.
*B64D 29/06* (2006.01)
*B64D 29/08* (2006.01)
*B64D 27/16* (2006.01)

(56) References Cited

U.S. PATENT DOCUMENTS

2014/0234090 A1* 8/2014 Hurlin .................... B64D 29/06
  415/182.1
2015/0098810 A1* 4/2015 Soria ....................... F01D 25/24
  415/200
2017/0008634 A1 1/2017 Lacko
2017/0327240 A1* 11/2017 Kerbler .................... F02K 1/72

* cited by examiner

PROPULSION UNIT FOR AIRCRAFT COMPRISING AN ASSEMBLY BOX-TYPE STRUCTURE IN THE SIX O'CLOCK POSITION

CROSS-REFERENCE TO RELATED APPLICATIONS

This application is a continuation of International Application No. PCT/FR2018/053271, filed on Dec. 13, 2018, which claims priority to and the benefit of FR 17/62052 filed on Dec. 13, 2017. The disclosures of the above applications are incorporated herein by reference.

FIELD

The present disclosure relates to propulsion unit for an aircraft.

BACKGROUND

The statements in this section merely provide background information related to the present disclosure and may not constitute prior art.

Figure 1:
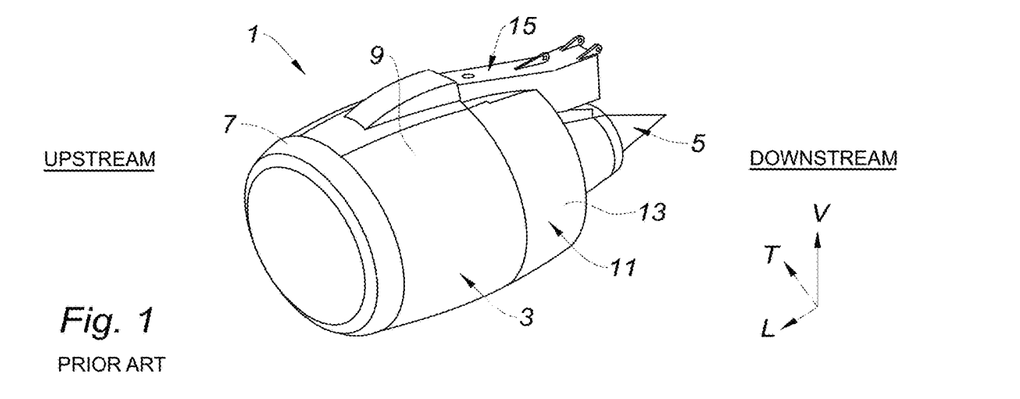
FIG. 1 is an isometric view of a propulsion unit of the prior art.

An aircraft is moved by several propulsion units each comprising a turbojet engine housed in a nacelle. Reference is made to FIG. 1 illustrating a propulsion unit 1 of the prior art. Propulsion unit 1 comprises a nacelle 3 and a turbojet engine 5, for example of the bypass type, capable of generating via the blades of the rotating fan a hot gases flow (also called primary flow) and a cold air flow (also called secondary flow) which circulates outside the turbojet engine through an annular passage, also called flow path, formed between two concentric walls of the nacelle. The primary and secondary flows are ejected from the turbojet engine from the rear of the nacelle.

The nacelle 3 generally has a tubular structure comprising an upstream section, or air inlet 7, located upstream of the turbojet engine 5, a median section 9 intended to surround a fan of the turbojet engine, a downstream section 11, intended to surround the combustion chamber of the turbojet engine, embedding thrust reversal devices, and can be terminated by an ejection nozzle located downstream of the turbojet engine.

The downstream section 11 generally has an outer structure including an outer cowl 13, which defines, with a concentric inner structure (not visible in FIG. 1), called "Inner Fixed Structure" (IFS), the annular flow path serving to channel the cold air flow.

The inner structure defines an inner portion of the annular flow path, and generally includes two half-shells connected together "at six o'clock" via a locking device.

Generally, the nacelle 3 is connected via a suspension pylon 15 also called reactor mast, to the wing of the aircraft (not represented).

The thrust reversal devices allow, during the landing of an aircraft, improving the braking capacity thereof by redirecting forward a majority fraction of the thrust generated by the turbojet engine.

In this phase, the thrust reverser generally obstructs the flow path of the cold air flow and directs the latter forward of the nacelle, generating a counterthrust in addition to the braking of the aircraft wheels. The methods implemented to achieve this reorientation of the cold air flow vary depending on the type of thrust reverser.

A common configuration is that of the so-called "cascade" thrust reversers.

In this type of thrust reverser, the outer cowl 13 of the downstream section is sliding. The downstream translation of this sliding cowl allows uncovering the cascade thrust reverser bringing the flow path of the cold flow into communication with the outside of the nacelle.

The translation of the outer cowl 13 further allows deploying blocking flaps in the flow path of the cold flow. Thus, by the combined action of the blocking flaps and cascade thrust reverser, the cold flow is redirected forward of the nacelle.

As mentioned above, the thrust reversal devices are housed in the downstream section of a nacelle. There are mainly three types of structural configuration known for the downstream section, namely the structures respectively called "C-shaped" (or "C-duct"), "D-shaped" (or "D-duct"), and "O-shaped" (or "O-duct") structures.

In the following description, the expression "D-shaped structure nacelle" defines, for a better reading, a "nacelle whose downstream section is with a D-shaped structure." The same applies to a "C-shaped structure nacelle" or an "O-shaped structure nacelle." Likewise, the expression "D-shaped structure" defines the structural configuration of the downstream section of the nacelle. The same applies to a "C-shaped structure" or an "O-shaped structure."

Figure 2:
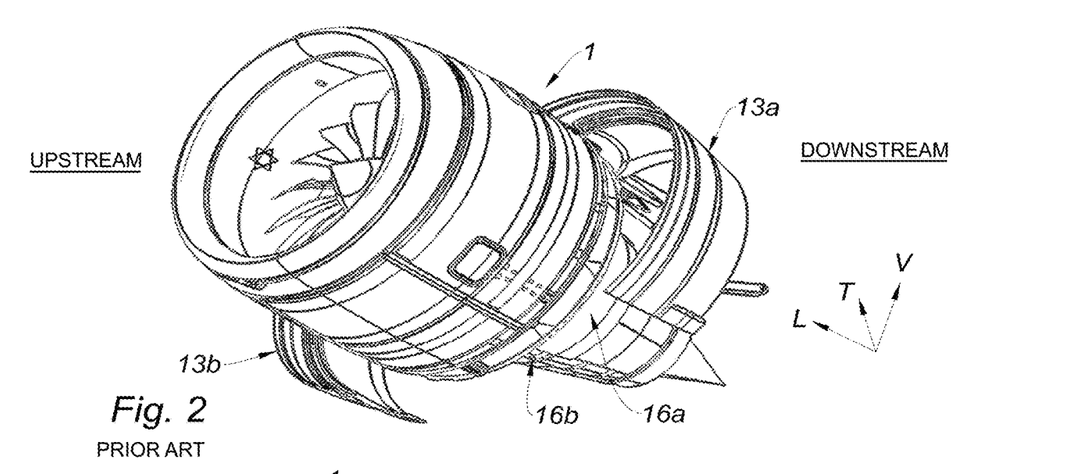
FIG. 2 illustrates a propulsion unit of the prior art, during the opening of the nacelle for the maintenance of the turbojet engine.

An O-shaped structure nacelle (not represented in the figures) includes an integral annular outer cowl, while a C-shaped structure has two outer half-cowls 13a, 13b, visible in FIG. 2 illustrating a propulsion unit 1 during opening for maintenance.

In an O-shaped or C-shaped structure, the integral annular outer cowl or the outer half-cowls are mounted in translation on rails disposed on either side of the suspension pylon of the propulsion unit. The outer cowling, defined by the integral annular outer cowl of an O-shaped structure or by the outer half-cowls of a C-shaped structure, is guided at the level of its rails mounted at twelve o'clock in the nacelle.

To access the turbojet engine of a C-shaped structure nacelle, the two half-cowls 13a, 13b initially locked together at six o'clock are firstly unlocked when the nacelle is in operation, then these cowls are subsequently opened in "butterfly" position about an axis substantially coincident with the longitudinal axis of the suspension pylon, then in a third step, the two half-shells 16a, 16b forming the inner structure of the downstream section are unlocked, then in a fourth step, the two half-shells 16a, 16b are opened in "butterfly" about an axis parallel to the longitudinal axis of the nacelle.

To access the turbojet engine of an O-shaped structure nacelle, firstly the integral annular outer cowl is slid downstream of the nacelle and then, in a second step, the two half-shells forming the inner structure of the downstream section are unlocked then, in a third step, the two half-shells are opened in "butterfly" position about an axis parallel to the longitudinal axis of the nacelle.

The time to access the turbojet engine with C-shaped or O-shaped structures to perform maintenance operations is significant. Likewise, the number of steps to access such turbojet engines is also high.

The prior art often uses nacelles with a D-shaped structure downstream section.

Figure 3:
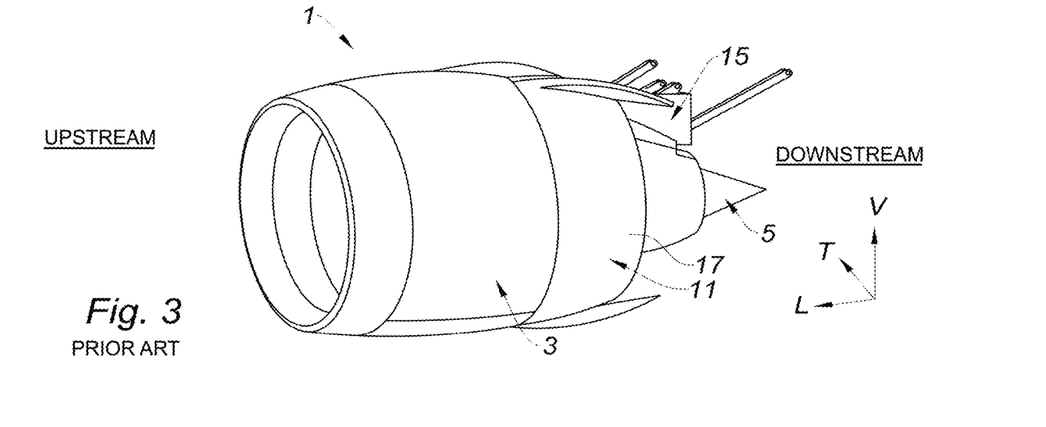
FIG. 3 illustrates a propulsion unit of the prior art equipped with a D-shaped structure nacelle.

FIG. 3 illustrates a propulsion unit 1 comprising a nacelle 3 whose downstream section 11 is a D-shaped structure 17.

In a D-shaped structure nacelle, the inner and outer structures of the downstream section of the nacelle are secured to one another, via two connecting islands called bifurcations. The bifurcations are disposed respectively in the positions called "at twelve o'clock" (upper bifurcation) and "at six o'clock" (lower bifurcation).

A D-shaped structure includes two D-shaped half-structures, connected to each other at six o'clock at the bifurcation, and pivotally mounted about an axis substantially coincident with the longitudinal axis of the suspension pylon 15.

Figure 4:
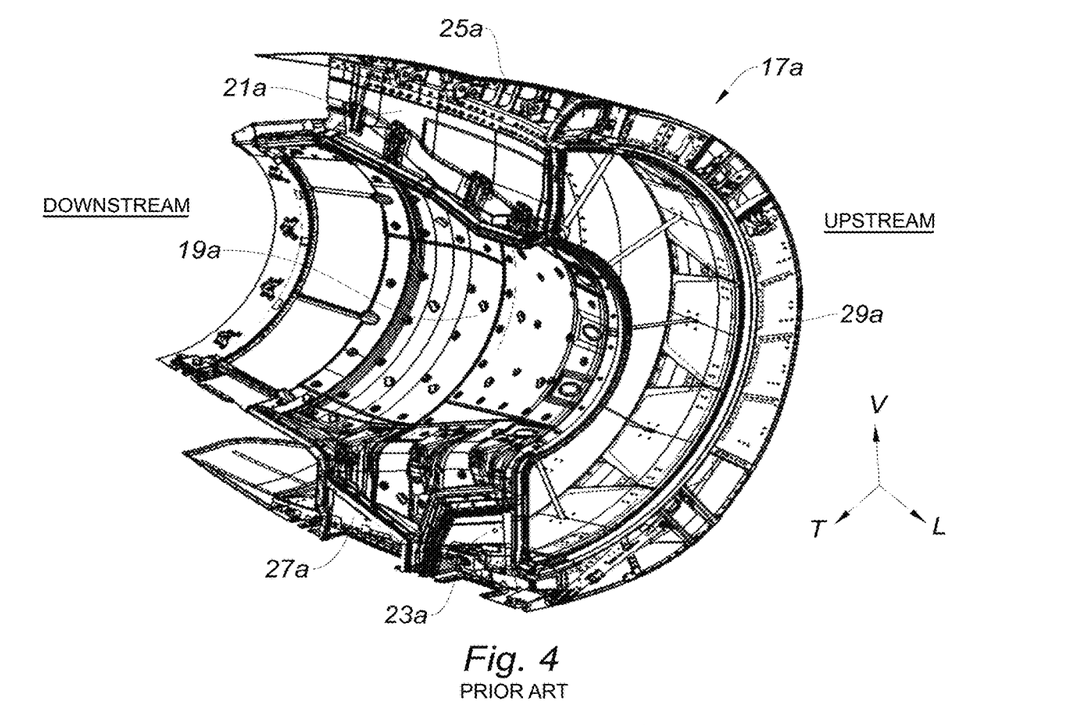
FIG. 4 represents a D-shaped half-structure of the D-shaped structure nacelle of FIG. 3.

Reference is made to FIG. 4 in which is represented a D-shaped half-structure 17a of the D-shaped structure nacelle in FIG. 2. The configuration of the D-shaped half-structure 17a which will be described is identical to a second half-structure forming the D-shaped structure. The elements composing the D-shaped half-structure 17a and identified by the suffix "a" can be reused in the following description with the suffix "b" to refer to the elements composing the D-shaped half-structure 17b, obtained by symmetry of the D-shaped half-structure 17a with respect to a plane (LV) of the nacelle.

In a D-shaped structure, the D-shaped half-structure 17a includes an inner half-structure 19a, secured at twelve o'clock to a twelve o'clock half-bifurcation 21a and at six o'clock to a six o'clock half-bifurcation 23a.

On the twelve o'clock half-bifurcation 21a is mounted a twelve o'clock half-beam 25a, and on the six o'clock half-bifurcation 23a is mounted a six o'clock half-beam 27a.

Each half-beam 25a, 27a supports a sliding rail (not visible in FIG. 3) of an outer half-cowl 29a, mounted in translation on each six o'clock and twelve o'clock half-beam. The translating outer cowl, formed by the two outer half-cowls, is called "transcowl." Thus, in a D-shaped structure, the translating outer cowl is guided in translation at the level of its rails mounted at six o'clock and twelve o'clock.

Access to the turbojet engine of a D-shaped structure nacelle is obtained firstly by unlocking the two D-shaped half-structures initially locked together at six o'clock when the nacelle is in operation, then by secondly opening these D-shaped half-structures in "butterfly" about an axis substantially coincident with the longitudinal axis of the suspension pylon.

By planning to make the inner half-structure 19a secured to the outer half-cowl 29a, the butterfly opening of the D-shaped half-structures allows access to the turbojet engine in only two times. Thus, the intervention time for accessing the turbojet engine is reduced compared to the C-shaped or the O-shaped structures.

In the case of a thrust reverser with cascade vanes, the cascade vanes, which provide the redirection of the cold flow, can be movable in translation. The provisioning of translating cascade vanes in a thrust reverser allows reduction of the length of the nacelle and consequently to limit its mass and its drag.

In fact, when the nacelle operates in direct jet, the cascade vanes are housed in an annular envelope defined by the annular space comprised between the fan casing of the turbojet engine and the fan cowl of the nacelle, surrounding the fan casing.

In such a configuration of a thrust reverser with translating cascade vanes, a connection device is provided between a downstream frame supporting the cascade vanes in their downstream portion, and the reverser outer cowling (formed by an annular integral outer cowl in an O-shaped structure, and by two outer half-cowls in a C-shaped or D-shaped structure). When the reverser outer cowling is displaced downstream of the nacelle, the cascade vanes are displaced in concert with the outer cowling, thanks to the connection device. When the reverser outer cowl has reached its deployed position, the cascade vanes are no longer housed in the annular envelope but are exposed to the secondary air flow circulating in the flow path. The secondary air flow, blocked by the reversing flaps, is then diverted by the cascade vanes.

In a C-shaped or O-shaped structure nacelle, the translation of the cascade vanes is obtained by providing at least two rails for guiding the cascade vanes, disposed at twelve o'clock along the suspension pylon, in the extension of the rails supporting the sliding cowl, and by providing at least two rails for guiding the cascade vanes, disposed at six o'clock on the fan casing and ending in edge to edge with the downstream end of the fan casing. The cascade vanes have slides designed to slide in the rails for guiding the cascade vanes.

In a configuration advantageous in that it provides continuity of the force passage when the cascade vanes are deployed, the six o'clock rails for guiding the cascade vanes are extended downstream of the fan casing.

Figure 5:
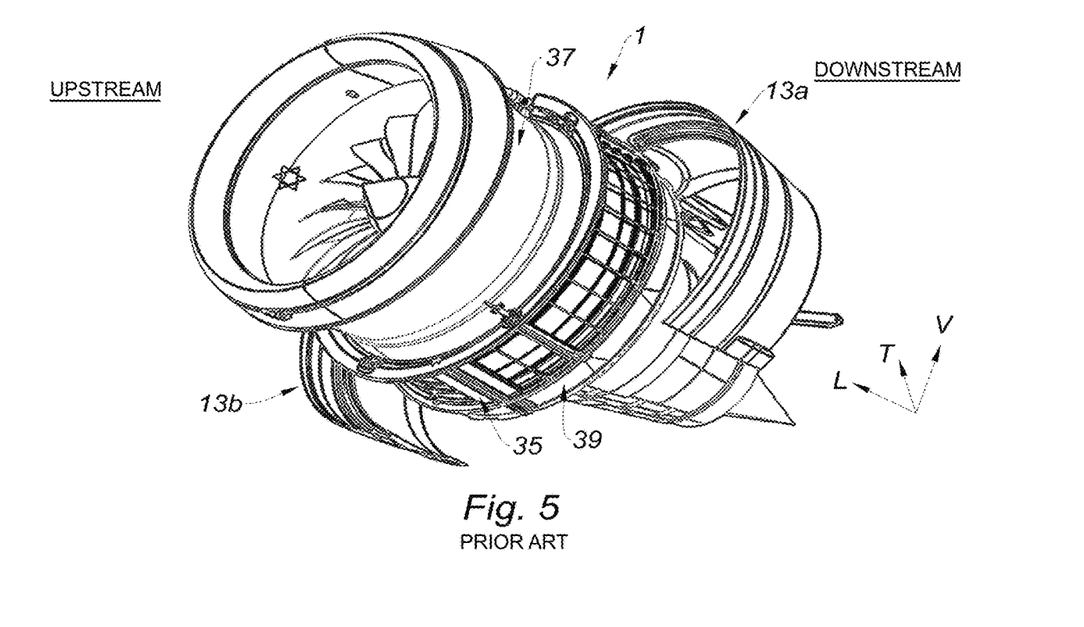
FIG. 5 illustrates a propulsion unit of the prior art equipped with a C-shaped structure nacelle.

Reference is made to FIG. 5, illustrating the propulsion unit 1 of FIG. 2 in which the nacelle is a C-shaped structure nacelle.

In FIG. 5, the fan cowl of the nacelle has been removed for better visibility.

Six o'clock rails 35 for guiding the cascade vanes are affixed to the fan casing 37 and extended downstream of the fan casing 37. An annular ring 39 is mounted downstream of the fan casing 37 to support the extended portion of the six o'clock rails 35 for guiding the cascade vanes. According to an alternative form, not represented, the six o'clock rails for guiding the cascade vanes can be cantilevered and extended downstream of the fan casing. An identical arrangement of such six o'clock guide rails can be operated on an O-shaped structure nacelle.

In a D-shaped structure nacelle, the extension of the six o'clock rails for guiding the cascade vanes downstream of the fan casing is currently not made possible.

Figure 6:
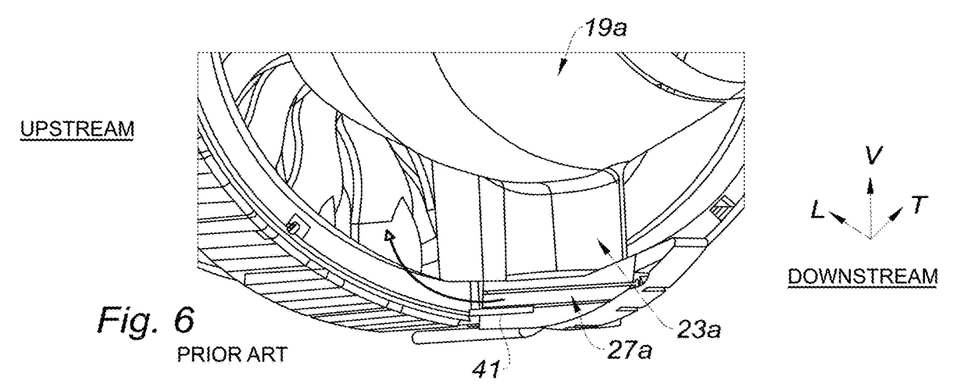
FIG. 6 illustrates a six o'clock zone of a propulsion unit of the prior art equipped with a D-shaped structure nacelle.

Indeed, as represented in FIG. 6 illustrating the six o'clock zone of a propulsion unit 1 of a D-shaped structure nacelle, a six o'clock rail 41 for guiding the cascade vanes is mounted outside the six o'clock half-beam 27a mounted on the six o'clock half-bifurcation 23a connecting the inner half-structure 19a. A six o'clock rail for guiding the cascade vanes is also mounted on the outside of the second six o'clock half-beam (not visible) mounted on the second six o'clock half-bifurcation (not visible).

The extension of the six o'clock rails 41 for guiding the cascade vanes downstream of the fan casing 37 results in interference between the six o'clock rails 41 for guiding the cascade vanes and the two six o'clock half-beams of the nacelle, during the opening of the D-shaped half-structures in butterfly (according to the arrow represented in FIG. 6) to perform maintenance operations on the turbojet engine.

In another form of the prior art, the six o'clock rails for guiding the cascade vanes are mounted inside each six o'clock half-beam would cause interference between the slide of the cascade vanes and the two six o'clock half-beams when displacing the cascade vanes downstream of the nacelle.

SUMMARY

This section provides a general summary of the disclosure and is not a comprehensive disclosure of its full scope or all of its features.

The present disclosure provides a nacelle for an aircraft turbojet engine, with a downstream D-shaped structure, including a thrust reverser with movable cascade vanes whose six o'clock rails for guiding the cascade vanes extend downstream of the fan casing of the turbojet engine.

To this purpose, the present disclosure concerns a propulsion unit for aircraft, comprising a nacelle supporting a turbojet engine, the nacelle comprises an upstream air inlet section, a median section, in the downstream extension of the upstream section, comprising a fan cowl, the annular space comprised between the fan cowl and a fan casing of the turbojet engine defining an annular envelope, and a D-shaped structure downstream section embedding a thrust reverser device, the D-shaped structure downstream section comprising cascade vanes movable between a retracted position according to which the cascade vanes are housed in the annular envelope of the median section and a deployed position according to which the cascade vanes are displaced downstream of the annular envelope, the D-shaped structure downstream section comprising two D-shaped half-structures.

Each D-shaped half-structure comprises an outer half-cowl, movable in translation during the activation of the actuating devices along a substantially longitudinal axis of the propulsion unit, between a retracted position providing aerodynamic continuity with the fan cowl and an annular flow path, for an operation of the nacelle in direct jet and a deployed position opening an annular passage in the nacelle for an operation of the nacelle in reverse jet, a connection device between the cascade vanes and the outer half-cowl, arranged so that the cascade vanes are displaced in concert with the outer half-cowl during the activation of the actuating devices, a six o'clock half-bifurcation, an inner half-structure defining an inner portion of the annular flow path of the nacelle when the nacelle is in operation, the inner half-structure being connected to the outer half-cowl by the six o'clock half-bifurcation, a six o'clock half-beam mounted on the six o'clock half-bifurcation, supporting a sliding rail in translation of the outer half-cowl, and at least two six o'clock rails for guiding the cascade vanes, affixed to the fan casing of the turbojet engine.

The propulsion unit being remarkable in that it includes an assembly box, cantilever mounted downstream relative to the fan casing and directly affixed to the fan casing, the assembly box comprising at least two rails for guiding the cascade vanes, a locking device between the assembly box and each six o'clock half-beam of each D-shaped half-structure, and the assembly box being arranged in the propulsion unit so that the rails for guiding the cascade vanes of the assembly box are located in the extension of the six o'clock rails for guiding the cascade vanes affixed to the fan casing, so as to provide continuity between the rails for guiding the cascade vanes of the assembly box and the six o'clock rails for guiding the cascade vanes affixed to the fan casing.

Thus, by providing an assembly box provided with rails for guiding the cascade vanes located in the extension of the six o'clock rails for guiding the cascade vanes affixed to the fan casing, the box being cantilever mounted downstream of the fan casing and including a locking device between the box and each six o'clock half-beam of each D-shaped half-structure, a propulsion unit is obtained, whose nacelle is a D-shaped structure nacelle, which allows facilitating the access to the turbojet engine during maintenance operations, thrust reverser device has translating cascade vanes, which allows reduction of the length of the nacelle, and consequently to reduce the mass and the drag of the nacelle, and rails for guiding the translating cascade vanes extend downstream of a downstream edge of the fan casing, which allows providing a continuity of the force passage when the cascade vanes are deployed.

According to optional forms of the propulsion unit of the present disclosure, the assembly box includes an annular fixing flange, mounted upstream of the assembly box and affixing to the fan casing. This allows the fan casing to take up well the forces undergone by the box when the outer cowl is deployed, the assembly box includes a downstream compartment downstream of the annular fixing flange, the downstream compartment of the assembly box includes a hollow inner space, for the passage of ancillaries of the turbojet engine. This provides good integration of the turbojet engine in a propulsion unit, and the downstream compartment of the assembly box has a substantially parallelepiped shape.

The assembly box according to the present disclosure comprises at least two rails for guiding the cascade vanes of the assembly box that are each integrated into a longitudinal outer wall of the downstream compartment of the assembly box, the assembly box includes a bottom wall providing aerodynamic continuity with the two D-shaped half-structures, the bottom wall being designed to come into contact with an outer air flow flowing around the nacelle, and the two D-shaped half-structures are connected together at a connection zone located downstream of the assembly box.

The locking device between the assembly box and each six o'clock half-beam of each D-shaped half-structure is positioned at an upstream portion of the half-beam, which allows locking the six o'clock half-beams between them via the assembly box, in addition to the direct locking of the six o'clock half-beams carried out at level of the connection zone downstream of the assembly box, the length of the downstream compartment of the assembly box is between 25% and 75% of the length of the six o'clock half-beam of the D-shaped half-structure, and the assembly box includes a sealing device providing sealing with the six o'clock half-beams.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The terms "upstream" and "downstream" must be understood relative to the circulation of the air flow inside the propulsion unit formed by the nacelle and the turbojet engine, that is to say from left to right with reference to FIG. 1.

Likewise, the expressions "inner" and "outer" will be used in a non-limiting manner with reference to the radial distancing relative to the longitudinal axis of the nacelle, the expression "inner" defining a zone radially closer to the longitudinal axis of the nacelle, as opposed to the expression "outer."

Furthermore, the longitudinal, vertical and transverse terminology will be adopted without limitation, with reference to the trihedron L, V, T indicated in the figures.

Furthermore, in all of these figures, identical or similar reference numerals refer to identical or similar members or sets of members.

Figure 7:
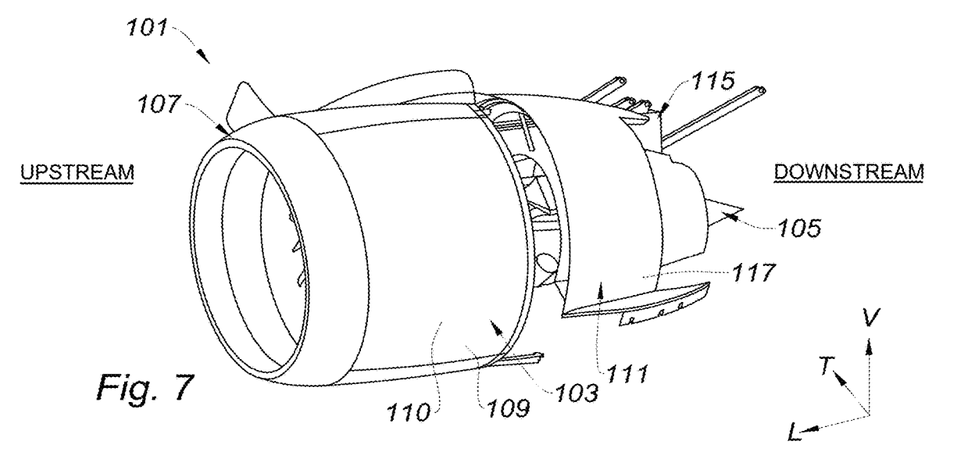
FIG. 7 illustrates in isometric view the propulsion unit according to the teachings of the present disclosure in the open position for the maintenance of the turbojet engine.
Figure 8:
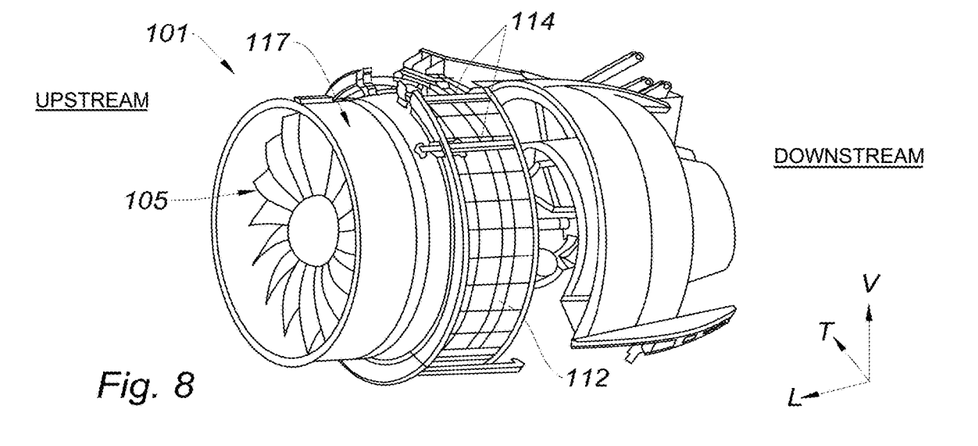
FIG. 8 is FIG. 7 with the upstream and median sections of the nacelle removed for better visibility.
Figure 9:
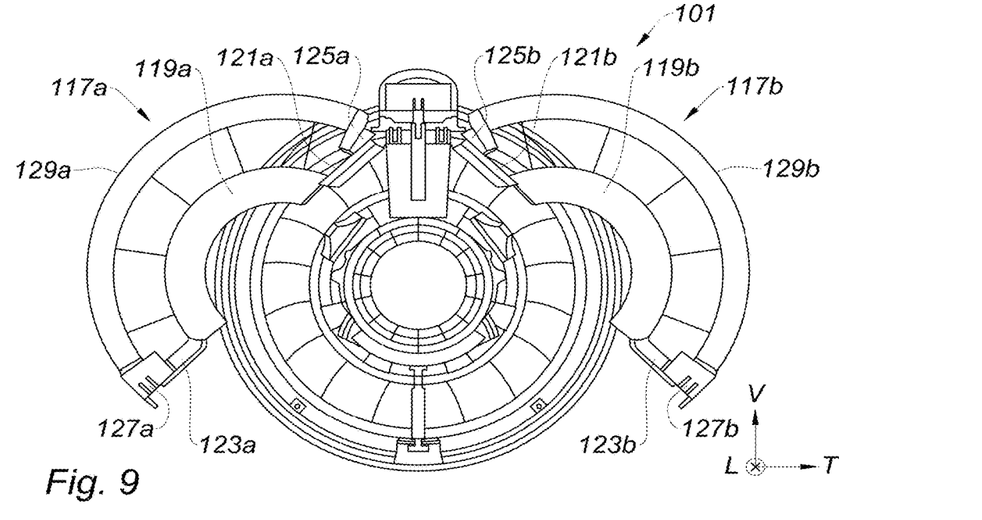
FIG. 9 shows the propulsion unit of FIG. 7 in rear view.

Reference is made to FIGS. 7 to 9, illustrating a propulsion unit 101 according to the present disclosure.

In FIG. 7, the propulsion unit 101 is in the open position for the maintenance of the turbojet engine. FIG. 8 is identical to FIG. 7, the upstream and median sections of the nacelle having been removed for better visibility. FIG. 9 represents the propulsion unit 101 in rear view.

The propulsion unit 101 includes a nacelle 103 having a tubular structure and comprising an upstream section, or air inlet 107, located upstream of the turbojet engine 105, a median section 109 intended to surround a fan of the turbojet engine and including a fan cowl 110, a downstream section 111, intended to surround the combustion chamber of the turbojet engine, embedding thrust reversal devices, which can be terminated by an ejection nozzle located downstream of the turbojet engine. The nacelle 103 is connected via a suspension pylon 115 to the wing of the aircraft (not represented).

The downstream section 111 has a D-structure 117. The D-structure 117 includes two D-shaped half-structures 117a, 117b, each including an inner half-structure 119a, 119b secured at twelve o'clock to a twelve o'clock half-bifurcation 121a, 121b and at six o'clock to a six o'clock half-bifurcation 123a, 123b.

On the twelve o'clock half-bifurcation 121a, 121b is mounted to twelve o'clock half-beam 125a, 125b and on the six o'clock half-bifurcation 123a, 123b is mounted to six o'clock half-beams 127a, 127b.

Each half-beam 125a, 125b, 127a, 127b supports a sliding rail (not visible in FIGS. 7 to 9) of two outer half-cowls 129a, 129b mounted in translation on each six o'clock and twelve o'clock half-beam.

The downstream section 111 with a D-structure 117 comprises cascade vanes (not represented).

The cascade vanes are movable between a retracted position according to which the cascade vanes are housed in an annular envelope 112 (visible in FIG. 8) defined by the annular space comprised between the fan cowl 110 and the fan casing 137 of the turbojet engine 105 and a deployed position according to which the cascade vanes are displaced downstream of the annular envelope 112.

Actuating includes actuators 114 that are mounted on the fan casing 137 and include a rod affixed to the outer half-cowls 129a, 129b.

The activation of these actuating devices allows for a displacement of the outer cowls 129a, 129b, which displacement causes in concert a displacement in translation of the cascade vanes, connected to the outer half-cowls by a connection device (not represented).

In direct jet operation of the nacelle, the half-cowls 129a, 129b are in the retracted position and provide an aerodynamic continuity with the fan cowl 110. The cascade vanes are in the retracted position.

During activation of the actuating devices, the outer half-cowls are translated downstream of the nacelle, until reaching a deployed position opening in the nacelle an annular passage, for an operation of the nacelle in reverse jet. The cascade vanes are deployed downstream of the nacelle thanks to connection with the outer half-cowls and are located in the annular passage thus defined in the nacelle.

Figure 10:
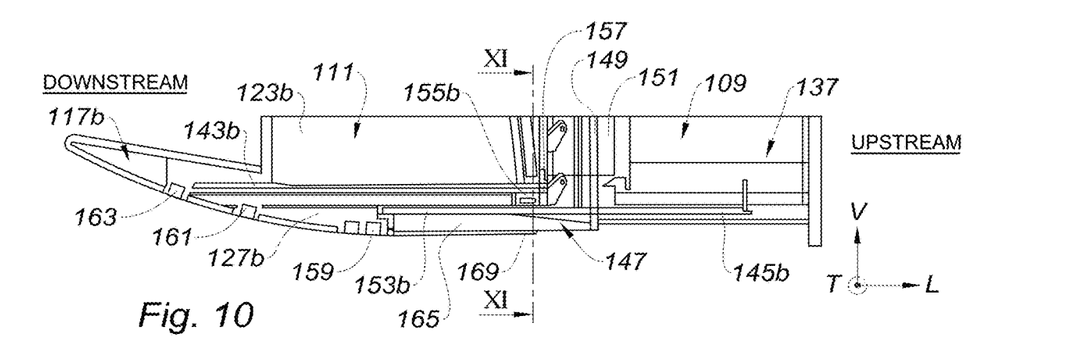
FIG. 10 illustrates the six o'clock zone of the propulsion unit according to the teachings of the present disclosure in longitudinal section, centered on the median and downstream sections of the nacelle.
Figure 11:
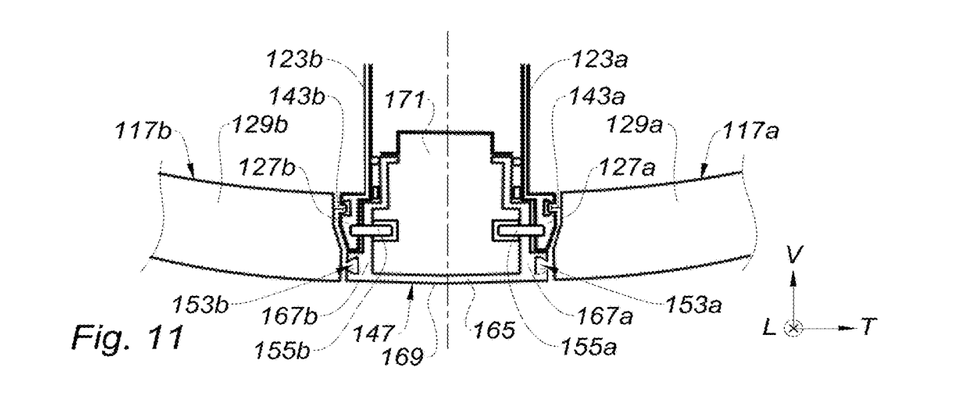
FIG. 11 is a cross-sectional view along the line XI-XI of FIG. 10.

Reference is made to FIGS. 10 and 11. FIG. 10 illustrates the six o'clock zone of the propulsion unit 101 in longitudinal section, centered on the median section 109 and downstream 111 sections of the nacelle 103, and FIG. 11 is a cross-sectional view of the propulsion unit 101 according to line XI-XI of FIG. 10.

The six o'clock half-beam 127a, respectively 127b, respectively mounted on the six o'clock half-bifurcation 123a, respectively 123b, supports a sliding rail 143a, respectively 143b of the outer half-cowl 129a, respectively 129b.

On the fan casing 137 are affixed two six o'clock rails 145a, 145b for guiding the cascade vanes (only six o'clock rail 145b is visible in FIGS. 10 and 11).

According to the present disclosure, the propulsion unit 101 includes an assembly box 147 cantilever mounted downstream relative to the fan casing 137.

The assembly box 147 is affixed directly to the fan casing 137, for example by devices such as an annular fixing flange 149 which is an integral portion of the assembly box.

The annular fixing flange 149 of the assembly box 147 is affixed to a downstream edge 151 of the fan casing 137. The annular fixing flange provides the passage of forces between the assembly box 147 and the fan casing 137.

The assembly box 147 includes two rails 153a, 153b for guiding the cascade vanes. The rails 153a, 153b for guiding the cascade vanes mounted on the assembly box 147 are located in the extension of the six o'clock rails 145a, 145b for guiding the cascade vanes affixed to the fan casing.

Continuity between the rails 153a, 153b for guiding the cascade vanes of the assembly box 147 and the six o'clock rails 145a, 145b for guiding the cascade vanes affixed to the fan casing is thus provided.

A locking device 155a, 155b is mounted on the assembly box 147 between the assembly box and the six o'clock half-beams 127a, 127b of each D-shaped half-structure 117a, 117b. This allows locking of the six o'clock half-beams together via the assembly box.

The locking device 155a, 155b is positioned at an upstream portion 157 of the half-beams 127a, 127b.

Moreover, the two D-shaped half-structures 117a, 117b are connected together at a connection zone located downstream of the assembly box 147, via locks 159, 161, 163.

The assembly box includes a downstream compartment 165 downstream of the annular fixing flange 149. The downstream compartment 165 has for example a substantially parallelepiped shape. The length of the downstream compartment of the assembly box is comprised between 25% and 75% of the length of one of the half-beams 127a, 127b of the D-shaped half-structure.

The rails 153a, 153b for guiding the cascade vanes of the assembly box are respectively integrated into longitudinal outer walls 167a, 167b of the downstream compartment 165 of the assembly box 147.

Figure 12:
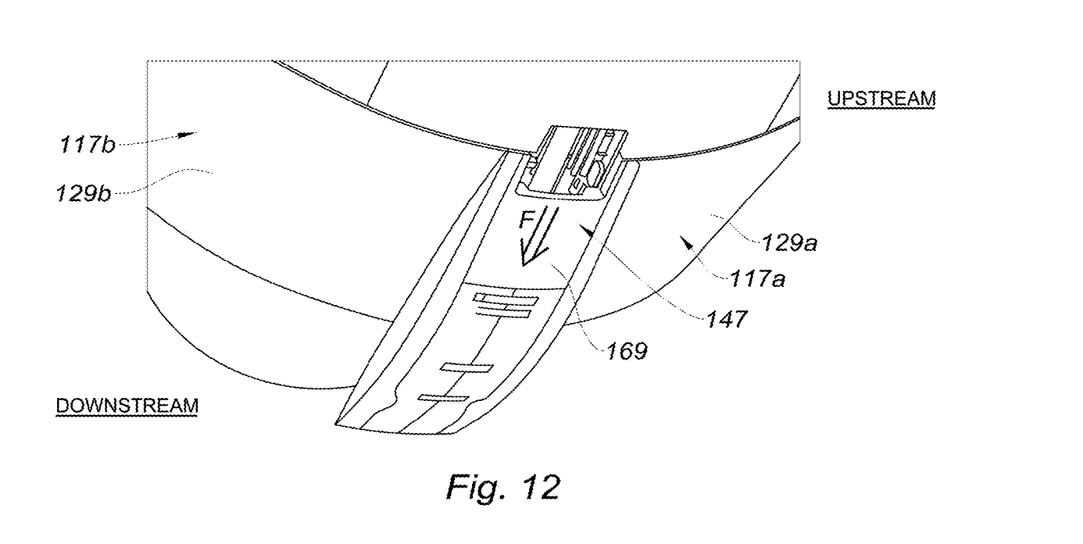
FIG. 12 represents the propulsion unit according to the teachings of the present disclosure in isometric view from below.

The assembly box 147 further includes a bottom wall 169 providing aerodynamic continuity with the two D-shaped half-structures 117a, 117b, and designed to come into contact with the outer air flow F flowing around the nacelle, as can be understood from FIG. 12 illustrating the propulsion unit 101 in an isometric view from below.

Figure 13:
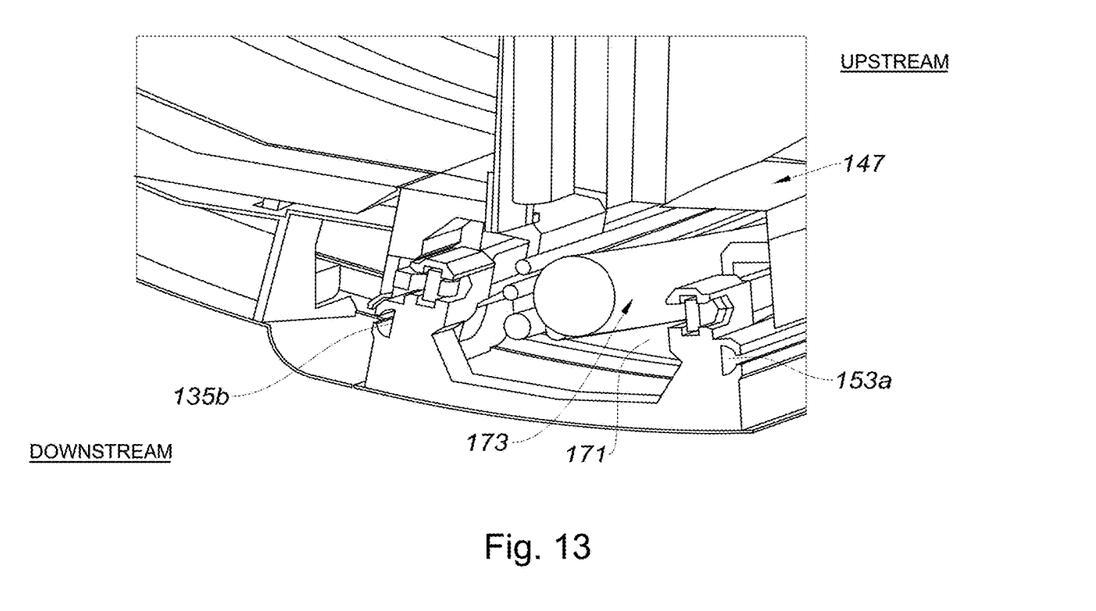
FIG. 13 shows the six o'clock zone of the propulsion unit, centered on the assembly box according to the teachings of the present disclosure.

Reference is made to FIG. 13, illustrating the six o'clock zone of the propulsion unit centered on the assembly box 147. The downstream compartment 165 includes a hollow inner space 171, allowing to pass ancillaries 173 of the turbojet engine such as for example tube paths, electrical harnesses or drains.

The assembly box 147 includes a sealing device (not represented in the figures) providing a seal with the six o'clock half-beams 127a, 127b. The sealing device is designed and arranged in the nacelle to provide fluid, pressure and fire segregation between each compartment of the propulsion unit relative to the exterior of the propulsion unit.

It goes without saying that the present disclosure is not limited to the only embodiments of this propulsion unit, described above only by way of illustrative examples, but on the contrary it encompasses all the variants involving the technical equivalents as well as their combinations if these fall within the scope of the present disclosure.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A propulsion unit for aircraft, comprising a nacelle supporting a turbojet engine, the nacelle comprising:
    an upstream air inlet section;
    a median section, in a downstream extension of the upstream air inlet section, comprising a fan cowl, an annular space between the fan cowl and a fan casing of the turbojet engine defining an annular envelope; and
    a D-shaped structure downstream section embedding a thrust reverser device, the D-shaped structure downstream section comprising cascade vanes movable between a retracted position wherein the cascade vanes are housed in the annular envelope of the median section and a deployed position wherein the cascade vanes are displaced downstream of the annular envelope, the D-shaped structure downstream section comprising two D-shaped half-structures, each comprising:
    an outer half-cowl, movable in translation during an activation of an actuator along a substantially longitudinal axis of the propulsion unit, between a retracted position providing aerodynamic continuity with the fan cowl and an annular flow path, for an operation of the nacelle in direct jet and a deployed position opening an annular passage in the nacelle for an operation of the nacelle in reverse jet;
    a connection device between the cascade vanes and the outer half-cowl, arranged so that the cascade vanes are displaced simultaneously with the outer half-cowl during the activation of the actuator;
    a six o'clock half-bifurcation;
    an inner half-structure defining an inner portion of the annular flow path of the nacelle when the nacelle is in operation, the inner half-structure being connected to the outer half-cowl by the six o'clock half-bifurcation;
    a six o'clock half-beam mounted on the six o'clock half-bifurcation, supporting a sliding rail in translation of the outer half-cowl;
    at least two six o'clock guiding rails for guiding the cascade vanes, affixed to the fan casing of the turbojet engine; and
    wherein the propulsion unit includes an assembly box, cantilever mounted downstream relative to the fan casing and directly affixed to the fan casing, the assembly box comprising:
    at least two guiding rails for guiding the cascade vanes,
    a locking device between the assembly box and each of the six o'clock half-beams of each of the D-shaped half-structures, and
    the assembly box being arranged in the propulsion unit so that the at least two guiding rails for guiding the cascade vanes of the assembly box are located in a downstream extension of the at least two six o'clock guiding rails for guiding the cascade vanes affixed to the fan casing, so as to provide continuity between the at least two guiding rails for guiding the cascade vanes of the assembly box and the at least two six o'clock guiding rails for guiding the cascade vanes affixed to the fan casing.

2. The propulsion unit according to claim 1, wherein the assembly box includes an annular fixing flange, mounted upstream of the assembly box and affixing to the fan casing.

3. The propulsion unit according to claim 2, wherein the assembly box includes a downstream compartment downstream of the annular fixing flange.

4. The propulsion unit according to claim 3, wherein the downstream compartment of the assembly box includes a hollow inner space, allowing passage of ancillaries of the turbojet engine.

5. The propulsion unit according to claim 3, wherein the downstream compartment of the assembly box has a substantially parallelepiped shape.

6. The propulsion unit according to claim 3, wherein the at least two guiding rails for guiding the cascade vanes of the assembly box are each integrated into a longitudinal outer wall of the downstream compartment of the assembly box.

7. The propulsion unit according to claim 3, wherein a length of the downstream compartment of the assembly box is between 25% and 75% of a length of the six o'clock half-beam of the D-shaped half-structure.

8. The propulsion unit according to claim 1, wherein the assembly box includes a bottom wall providing aerodynamic continuity with the two D-shaped half-structures, the bottom wall being configured to come into contact with an outer air flow flowing around the nacelle.

9. The propulsion unit according to claim 1, wherein the two D-shaped half-structures are connected together at a connection zone located downstream of the assembly box.

10. The propulsion unit according to claim 1, wherein the locking device between the assembly box and each of the six o'clock half-beams of each of the D-shaped half-structures is positioned at an upstream portion of each of the six o'clock half-beams.

11. The propulsion unit according to claim 1, wherein the assembly box includes a sealing device providing a seal with each of the six o'clock half-beams.

\* \* \* \* \*